Figure 1:
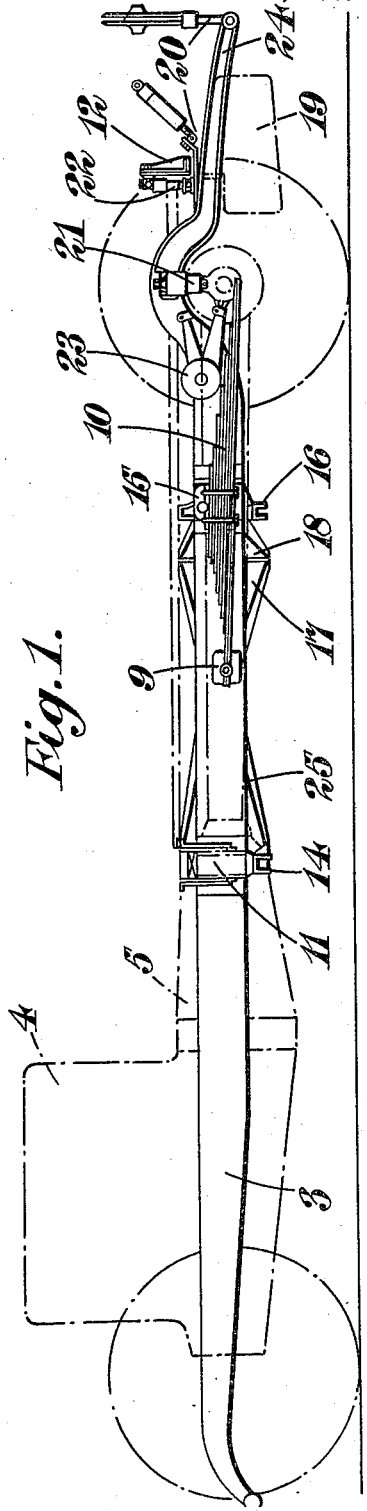
Figure 2:
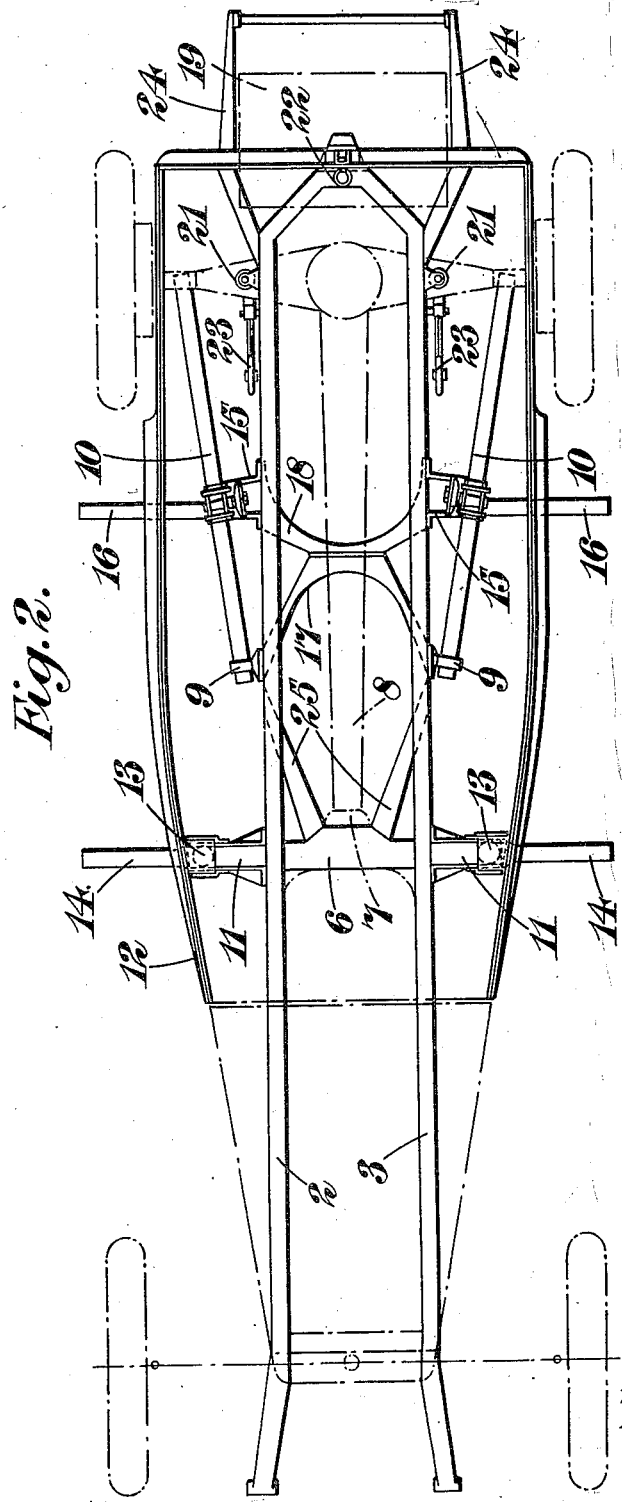

Dec. 6, 1927.

E. A. HELLSTRAND

MOTOR VEHICLE

Filed March 4, 1926

1,651,888

2 Sheets-Sheet 1

Dec. 6, 1927.

E. A. HELLSTRAND

MOTOR VEHICLE

Filed March 4, 1926

1,651,888

2 Sheets-Sheet 2

Patented Dec. 6, 1927.

1,651,888

UNITED STATES PATENT OFFICE.

EDWARD AXELSON HELLSTRAND, OF GUILDFORD, ENGLAND.

MOTOR VEHICLE.

Application filed March 4, 1926, Serial No. 92,341, and in Great Britain March 14, 1925.

This invention relates to motor vehicles, and it has for its object to provide an improved construction and arrangement of the chassis and associated parts for use with a motor vehicle body or body shell which, for example, may be supported upon it at three points only, two near the front and one near the back.

The shortcomings of the present day motor vehicles are chiefly due to lack of co-operation between the chassis and coach work designers and to the divergence of their respective ideals. Thus there are three systems of chassis design, viz: (1) Rigid, (2) semi-rigid, (3) flexible, and three similar systems of coach work design; affording nine possible combinations, none of which, for various reasons, are entirely satisfactory on the lines as at present effected.

Rigidity of the chassis frame is here defined as a condition under which its side members are unable to move relatively to one another either as a whole or in part.

Without going into details it can be said that the ideals of the body designer are met by a perfectly rigid body shell which is light and which is not subjected to distorting strains. These desiderata are obtained by separating the coach work components into three groups, viz: (1) a body shell including windows and doors, (2) a floor structure, (3) a set of seats.

The ideals of the chassis designer may be summed up as a narrow and light frame which is therefore partially flexible, yet affording sufficient rigid support for the power and transmission units to prevent these being subjected to undue strain when the vehicle is passing over uneven surfaces.

It is the object of the present invention to provide a chassis frame, or combinations of frames, embodying the above mentioned features as well as those essential for its successful incorporation with the above quoted coach work component designs into a complete ideal motor vehicle.

According to the present invention, therefore, the chassis frame carries the body shell by a three-point (or more than three-point) suspension, and is so constructed as relatively to provide an extremely rigid portion or region within or between the suspension points.

Thus there may be an entirely rigid region about the mid length at which the power and transmission units derive their support, whilst semi-rigid, and also, if desired, flexible extensions from the rigid portion may be provided, and from these the body shell may be in part suspended.

It will be evident from the foregoing arrangement that there will be for the vital transmission elements a rigid portion which will be unaffected by movements of the semi-rigid or flexible portions of the chassis frame, and the body shell can be made perfectly rigid because its support will be derived partly from the rigid and partly from the semi-rigid or flexible parts of the chassis frame, and the supports will incorporate means to absorb all possible relative moment. This system of construction can be adapted to all sizes of motor vehicles, from the light two-seater up to the heavy passenger carrying omnibus or char-à-banc, its suitability depending upon the relative relationship of the extent of the rigid and the semi-rigid or flexible parts.

The accompanying drawings illustrate the application of the invention to a medium size chassis, such as is known as a three-litre model, Figure 1 is an elevation of the chassis frame showing such parts only as are essential to an understanding of the invention, and

Figure 2 is a plan.

The chassis comprises two parallel longitudinal members 2 and 3 with the engine 4 and gear box 5 between them, preferably arranged as close together as is possible. These may be connected together by cross members where necessary, and this frame is supported either by transverse springs, angularly arranged full or half cantilever springs, carried if need be by brackets or lateral extensions from the chassis. Or there may be attached to the side frame members dumb irons and brackets which project laterally from the frame and are attached to half elliptic springs so as to space the springs widely, as is the custom.

The rigid region of the chassis frame extends from a cross member 6 adapted to support the rear end of the gear box as well as the torque head 7 of the propeller shaft casing 8, as far as the brackets 9 housing the front ends of the rear springs 10 by virtue of rigid stays 25 connecting the centre of the cross member 6 with the side members close to the brackets 9.

At the outer part of the cross member 6 are stout pressed steel brackets 11 adapted to provide rigid points of support for the body shell. The latter is provided with a steel frame 12 of deep L-section, with a narrow horizontal flange at the top, and both top and bottom flanges projecting outwards, and is devoid of a floor. The joint on the bracket 11 may be a vibration absorbing pad housed between the two cup-shaped washers held together by a spring-loaded bolt. The lower washer is secured to the bracket 11, and the upper one is secured to a bracket 13 attached to the body frame 12. This bracket 13 is open to the side and downwards and has the washer secured to the under face of its horizontal part, which latter, together with vertical side parts, are adapted to encase the end of the bracket 11. The vibration absorbing pads may be pierced by one or more bolts connecting the shell and the frame, or, if preferred, the pad may be pierced in separate places for a set of bolts joining it to one unit, and another set of bolts joining it to the other unit. Obviously they may be of circular and rectangular shape and of different thickness and resiliency according to the nature of the joint desired.

The brackets 11 may, if desired, be extended downwards and sideways to form a bracket 14 or means for supporting the running board, and they may also have an upper portion extending across the frame to form part of the support for the floor structure.

Brackets 15 are provided on the longitudinal members for the support, pivotally or otherwise, of the suspension springs 10, and these brackets may also be extended at their lower ends 16 corresponding to the extensions 14, and, at their upper ends, as just described for supporting the floor boards. Two cross members 17 and 18 are united together in X-form and are provided with a central aperture which admits, and provides for the movements of, the propeller shaft casing 8. The respective ends of these cross members are united to the longitudinal members at the forward and central parts of the spring.

To the rear of these attachments the chassis frame is required to carry the fuel tank 19 and the carriers 20 for the spare wheels, as well as support the weight of the rear passengers and take the strains imposed by the action of the shock absorbers between the chassis frame and the rear axle casing as indicated at 21. This portion of the frame may be termed semi-rigid because the vertical depth of the two longitudinal members 2 and 3 is sufficient to prevent vertical distortion of the two together, although not wholly to withstand the twisting actions due to the springs and shock absorbers. For this reason, therefore, there is a centrally placed connection with the frame of the body shell at 22, and this also may be of the same general type as is indicated at 21. In conjunction with the latter there may be friction dampers of known type, as indicated at 23, which, with the other shock absorbers, render the suspension effective against pitching and rolling effects.

As will be seen, the fuel tank and spare wheel carrier are supported by arms 24 extending from the longitudinal members 2 and 3, and strictly these and the step brackets 16 are the only flexible extensions of the rear portion of the chassis frame.

From the rigid region above specified, the extending front portion of the chassis is flexible, but no distortion arising through this flexibility can be transmitted to the rigid portion. The position of the dashboard may be so near to the rigid part that slight relative movements can be provided for, either by a floating scuttle or one constructed in the manner of the three-part bonnet.

If preferred, the power and transmission units can be provided either on a sub-frame or made strong enough to enable them to be suspended centrally at the front and the back end respectively, whilst their lateral engagements with the side members of the chassis constitute merely vibration and torque resisting devices.

Although a preferred arrangement is the employment of only three points of suspension of the body shell, the actual number would depend on the size of the rigid region in relation to the size of the whole vehicle. Thus, if the type of cross bracing described is used on a smaller frame, and in any case where the weight would not be prohibitive, the rigid region could be extended as far as the central anchorage of the springs 10. In such a case, the shell could be supported from four rigid points located at the corners of the rigid region of the chassis, and the central rear suspension at 22 could then be omitted.

Taking an opposite example, if the chassis is extremely large, the rigid region, while extending to the central anchorage for the rear springs would leave a semi-rigid region so long that a flexible point from its rear centre to the shell would also be needed. For this reason the two points between the rear rigid brackets and the shell would then be designed to provide mainly for lateral stability, and vertical whips of the shell base would be prevented by a tie rod, frictional shock absorbers being introduced at the same points to prevent rolling of the shell and other similar objectionable displacements.

Among the advantages obtained from a chassis frame as above described it may be mentioned that a good steering lock is obtainable without special provision, and in considering the best means of avoiding twisting or distortion of the frame, the designer is not tied to a certain width for the support of the coachwork, gaps in which may be bridged by the floor structure, whilst the formation of the rigid brackets for the support of the body shell offers no difficulties.

To reduce movement arising at the joint between the shell and the rear of the chassis, it is preferred to arrange the horizontal centre of connection here level with that of the forward joints.

As it is essential when using certain kinds of seats that the floor surface should be in one plane to the full extent of travel for such seat, the longitudinal channel section members of the floor structure can be located on one or other side of the up-swept portion of the chassis members in the region of the rear axle casing, because generally the rollers or corner pieces of the seat will be either in front or behind the arch over the rear axle so that each arch will be accommodated inside the frame of a seat. For the differential casing there may be a slight doming of the floor boards adapted to provide at this point the desired clearance underneath.

What I claim as my invention and desire to secure by Letters Patent of the United States is:—

A chassis frame comprising two longitudinal members, a cross member connecting the two longitudinal members, brackets in line with the cross member, each bracket constituting a rigid point of support for the front end of a body shell, the frame at the cross member and brackets being a rigid region, the extremities of the frame being flexible, as and for the purpose described.

In testimony whereof I have signed my name to this specification.

EDWARD AXELSON HELLSTRAND.